3,479,267
INORGANIC ION EXCHANGE MEMBRANES FOR USE IN ELECTRICAL SEPARATORY PROCESSES
Krishnaswamy S. Rajan, Chicago, Ill., and Angelo J. Casolo, Franklin, Mass., assignors to the United States of America as represented by the Secretary of the Interior
No Drawing. Filed Nov. 30, 1967, Ser. No. 686,829
Int. Cl. B01j *1/08;* B01d *13/02;* B01k *3/10*
U.S. Cl. 204—180                                   7 Claims

ABSTRACT OF THE DISCLOSURE

Inorganic ion exchange membranes, suitable for use in electrical separatory processes such as transport depletion and electrodialysis, are prepared from insoluble complexes of a chelating agent and a metal from Group IV–B of the Periodic Table and the actinide series.

Background of invention

Electrical membrane separation processes in general take advantage of the differences in mobilities of various ions across permselective membranes. The effect of such processes is to either concentrate or deplete particular ions in the bulk solution being treated. A wide variety of uses have been found for these processes; examples of which include removal of salts from brackish, or saline water, recovery of spent acid solutions, recovery of pulping wastes, lowering of citric acid levels in fruit juices and the purification of colloidal suspensions.

Probably the most important single use of these processes has been the production of potable water by removing the minerals from brackish or saline water sources. Large numbers of organic permselective membranes have been developed for this purpose.

Results at government sponsored demonstration plants have shown that the single most important weakness in the demineralization of saline waters using electrical membrane processes has been the unreliability of organic ion-exchange membranes. These membranes tend to break down or become fouled in the presence of iron or detergents, are generally unstable to chemical attack or oxidation and show an accelerated rate of degradation with increasing temperature. This last deficiency is particularly troublesome because electrical membrane separatory processes proceed with much less resistance and greater efficiency at elevated temperatures.

Thus it is an object of this invention to provide an improved anion exchange membrane.

It is another object of this invention to provide an improved electrical membrane separatory process.

A further object of this invention is to provide an improved method of making anion exchange membranes.

Brief summary of invention

The present invention comprises a process for separating electrolytes from their solutions by employing inorganic ion exchange membranes having greater stability to high temperatures, chemical attack and fouling than do organic membranes customarily used in such processes. Membranes useful in this invention comprise insoluble metal chelate compounds containing vacant coordination sites on the central metal atom and are prepared by casting a mixture of the chelate compound and a binder material into a thin film.

Application of membranes to electrical separatory processes

Due to the ability of the membranes of this invention to remain stable at relatively high temperatures, to resist degradation and fouling and to remain stable under corrosive and oxidizing conditions, they have great utility in electrical membrane separatory processes; particularly in electrodialysis and transport depletion processes. These processes are well known in the art and have been extensively used to demineralize saline waters.

Transport depletion is the most basic of the electrically driven processes. In that process, demineralization depends upon the passage of ions through ion exchange membranes in which the ion transference numbers ($t+$ or $t-$) are different from their respective transference numbers in the solutions being treated. Concentration gradients are established at the membrane face because the number of ions involved in carrying electrical current through the membranes is different from the number of ions carrying current through the solution. The ion-selective membranes within a transport depletion cell are all of one type; being either anionic or cationic. A typical cell configuration comprises a plurality of membranes disposed between two electrodes. Depletion occurs on the anode side of each membrane and concentration on the cathode side.

Electrodialysis is a similar membrane process in which a driving force of electric current is used to move ions through a solution. Advantage is taken of the selective properties of both anionic and cationic membranes to separate the contained electrolytes. A typical electrodialysis cell consists of alternate cationic and anionic membranes positioned in a spaced relationship between a pair of driving electrodes. When an electromotive force is applied, cations travel through the cation-permeable membranes toward the cathode and anions travel through the anion permeable membranes toward the anode thereby forming alternate zones of enrichment and depletion.

Detailed description of the invention

Anion exchange membranes useful in the present invention comprise metals of Group IV–B of the Periodic Table and those of the actinide series in the form of insoluble metal chelate compounds containing vacant coordination sites on the central metal atom. Any chelatnig agent may be used provided that its resulting complex with the above group of metals is both insoluble and contains one or more vacant coordination sites on the metal atom. A particularly preferred chelating agent is 8-hydroxyquinoline.

Preparation of these metal complex membranes involves first forming the metal complex and thereafter casting it in the form of a thin film together with a suitable binder material. Formation of the metal chelate is done in a conventional manner by mixing a 5% solution of the chelating agent with a 0.1 to 0.2% solution of metal salt and separating the precipitated metal chelate. The metal chelate is then mixed with a suitable binder material, preferably dissolved in an appropriate solvent, and the resulting slurry is cast on a smooth surface, such as a glass plate, to form a uniform film of predetermined thickness. Thickness of the film, as cast, may conveniently range from about 15 to 50 mils.

Matrix-forming or binder materials which have been found useful include polytetrafluoroethylene, polyvinylidene fluoride, polyvinyl butyral and silicon based polymers. Polyvinylidene fluoride is particularly preferred because of its excellent thermal and chemical stability and its good mechanical properties. The binder material comprises about 15 to 70% by weight of the finished membrane.

Any relatively volatile solvent which can dissolve the binder material may be used. Examples of solvents found to be satisfactory include dimethyl formamide, dimethyl sulfoxide, dimethyl acetamide and the mono- and di-alkyl ethers of ethylene glycol. Mixtures of two or more solvents may also be used. Concentration of binder material in the solvent is not critical and may conveniently range from about 10 to 30%.

After casting the film, it is heated in order to drive off substantially all of the solvent. Heating temperature is not critical so long as it is not sufficiently high to destroy the metal chelate or damage the matrix or binder material. A temperature range of about 70 to 110° C. is preferred. After driving off the solvent, the finished membrane is conveniently removed from the casting plate by equilibration in an aqueous saline solution.

Example

Anion permselective ion exchange membranes were prepared by incorporating the 8-hydroxyquinoline complexes of zirconium and thorium into a polyvinylidene fluoride matrix. Slurries containing 10 to 15% by weight of the metal chelate, 25 to 30% by weight of dimethyl formamide and 55 to 65% by weight of a 20% solution of polyvinylidene fluoride in dimethyl acetamide were cast in the form of films of approximately 30 mils thickness on a glass plate. The films were dried at 90° C. in an oven for 2 hours in order to drive off substantially all of the solvent. They were then removed from the support plate by equilibration in an aqueous solution of 0.5 M potassium chloride. Typical electrical properties of the membranes thus formed are set out in the following table:

TABLE.—ELECTRICAL PROPERTIES

| Membrane | Resistance, ohm-cm.$^2$ | Transference No. (0.05-0.10M KCl) |
|---|---|---|
| Thorium-8-hydroxyquinoline complex | 32 | 0.60 |
| Zirconium-8-hydroxyquinoline complex | 80 | 0.93 |

Electrical resistances of the membranes were determined by measurement using a conductance bridge and a standard cell having a cross-section area of 5 cm.$^2$. The procedure consisted of placing the equilibrated membrane in the cell, filling the cell with 0.5 M NaCl and measuring the resistance with the conductance bridge. Membrane resistance was taken as the difference in the cell resistance with and without the membrane.

Membrane transference numbers reported are the transference numbers of chloride ions through each membrane. They were determined by the procedure described in "Office of Saline Water Test Manual For Permselective Membranes" found in OSW Research and Development Progress Report No. 77 (1964).

The membranes were found to have good stability when used in the electrodialysis of a sodium chloride brine at 60° C. and were non-fouling when exposed to low concentration of dodecylbenzene sulfonate.

While the above examples are illustrative of the membranes and processes of the present invention, they are not to be interpreted as limiting. It will be apparent to those skilled in the art that various adaptations and modifications of the invention described herein are possible without departing from its spirit and scope.

What is claimed:

1. An anion exchange membrane consisting essentially of a complex formed by the reaction of a chelating agent and a metal ion, said complex being insoluble and having at least one vacant coordination site on the central metal atom, said metal being chosen from the group consisting of metals of Group IV-B of the Periodic Table and metals of the actinide series, together with a binder material chosen from the group consisting of polyvinylidene fluoride, polytetrafluoroethylene and polyvinyl butyral, said binder material comprising about 15 to 70% by weight of the membrane.

2. The membrane of claim 1 wherein said chelating agent is 8-hydroxyquinoline and wherein said binder material is polyvinylidene fluoride.

3. The membrane of claim 2 wherein said metal is thorium.

4. The membrane of claim 2 wherein said metal is zirconium.

5. In a process wherein the concentration of ions in a solution is altered by selective passage of a portion of said ions through an ion exchange membrane under an electrical driving force, the improvement comprising utilizing as said ion exchange membrane a material consisting essentially of a chelate formed by the reaction of a chelating agent and a metal ion, said chelate being insoluble and having at least one vacant coordination site on the central metal atom, said metal being chosen from the group consisting of metals of Group IV-B of the Periodic Table and metals of the actinide series, together with a binder material chosen from the group consisting of polyvinylidene fluoride, polytetrafluoroethylene and polyvinyl butyral, said binder material comprising about 15 to 70% by weight of the membrane.

6. The process of claim 5 wherein said concentration is altered by electrodialysis.

7. The process of claim 5 wherein said concentration is altered by transport depletion.

References Cited

UNITED STATES PATENTS

| 3,056,647 | 10/1962 | Amphlett | 23—14.5 |
| 3,276,910 | 10/1966 | Grasselli et al. | 136—86 |
| 3,309,233 | 3/1967 | McPheeters et al. | 136—153 |
| 3,346,422 | 10/1967 | Berger | 136—148 |
| 3,350,230 | 10/1967 | Tannenberger et al. | 136—86 |

JOHN H. MACK, Primary Examiner

A. C. PRESCOTT, Assistant Examiner

U.S. Cl. X.R.

136—153, 204—295, 301